United States Patent
Kuehl et al.

(10) Patent No.: US 6,689,406 B2
(45) Date of Patent: Feb. 10, 2004

(54) CHOCOLATE COATING PROCESS AND DEVICE FOR SAME

(75) Inventors: Edward M. Kuehl, Dublin, OH (US); Robert W. King, Worthington, OH (US)

(73) Assignee: Nestec S.A., Vevey (CH)

( * ) Notice: Subject to any disclaimer, the term of this patent is extended or adjusted under 35 U.S.C. 154(b) by 430 days.

(21) Appl. No.: 09/729,347

(22) Filed: Dec. 5, 2000

(65) Prior Publication Data

US 2002/0068119 A1 Jun. 6, 2002

(51) Int. Cl.$^7$ ................ A23G 3/00; B05C 5/00
(52) U.S. Cl. ............ 426/303; 426/306; 426/302
(58) Field of Search ................ 426/302, 303, 426/304, 305, 306, 307, 249, 101; 118/14, 16, 24, 25, DIG. 16

(56) References Cited

U.S. PATENT DOCUMENTS

| | | |
|---|---|---|
| 615,191 A | 11/1898 | Lembke |
| 1,470,524 A | 10/1923 | Burt |
| 1,566,329 A | 12/1925 | Laskey |
| 1,777,896 A | 10/1930 | Rossi |
| 1,865,097 A | 6/1932 | Gilham |
| 1,951,694 A | 3/1934 | Goulstone ............ 226/100 |
| 2,246,871 A | 6/1941 | Balch ................ 107/54 |
| 2,288,970 A | 7/1942 | Weisbender ........... 99/137 |
| 2,418,190 A | 4/1947 | Overland ............. 107/54 |
| 2,457,110 A | 12/1948 | Burbank .............. 99/134 |
| 2,478,075 A | 8/1949 | Baker ................ 107/1 |
| 2,570,031 A | 10/1951 | Gibson ............... 99/137 |
| 2,646,757 A | 7/1953 | Hackmann ............. 107/1 |
| 2,742,000 A | 4/1956 | Hansen et al. ........ 107/27 |
| 2,774,314 A | 12/1956 | Moser ................ 107/1 |
| 3,091,194 A | 5/1963 | Dickinson ............ 107/54 |
| 3,213,808 A | 10/1965 | Schafer .............. 107/1 |
| 3,230,906 A | 1/1966 | MacManus ............. 107/54 |
| 3,285,202 A | 11/1966 | MacManus ............. 107/54 |
| 3,288,052 A | 11/1966 | Hough ................ 99/235 |
| 3,427,650 A | 2/1969 | Woody ................ 107/27 |
| 3,545,981 A | 12/1970 | Klein et al. ......... 99/138 |
| 3,554,137 A | 1/1971 | Carre et al. ......... 107/4 |
| 3,556,022 A | 1/1971 | Westin ............... 107/54 |
| 3,572,256 A | 3/1971 | Westin ............... 107/8 |
| 3,690,896 A | 9/1972 | Maxwell .............. 99/81 |
| 3,770,460 A | 11/1973 | Vroman ............... 426/279 |
| 3,818,859 A | 6/1974 | Kalmar ............... 118/24 |
| 3,821,452 A | 6/1974 | Hayashi .............. 426/502 |
| 3,824,950 A | 7/1974 | Woody ................ 118/14 |
| 3,851,084 A | 11/1974 | Rossen et al. ........ 426/343 |
| 3,940,226 A | 2/1976 | Verhoeven ............ 425/375 |
| 3,971,853 A | 7/1976 | Crowder .............. 426/249 |
| 4,054,271 A | 10/1977 | Lanzillo ............. 366/70 |
| 4,105,801 A | 8/1978 | Dogliotti ............ 426/99 |
| 4,113,819 A | 9/1978 | Hayashi et al. ....... 264/173 |
| 4,189,502 A | 2/1980 | Rubenstein ........... 426/249 |
| 4,200,658 A | 4/1980 | Katzman et al. ....... 426/512 |
| 4,279,932 A | 7/1981 | Koshida et al. ....... 426/89 |
| 4,305,965 A | 12/1981 | Cheney ............... 426/104 |
| 4,357,359 A | 11/1982 | Cloud et al. ......... 426/103 |
| 4,369,200 A | 1/1983 | Iwao et al. .......... 426/660 |
| 4,382,968 A | 5/1983 | Akutagawa ............ 426/249 |

(List continued on next page.)

FOREIGN PATENT DOCUMENTS

| | | |
|---|---|---|
| EP | 0 277 408 | 8/1988 |
| EP | 0 570 313 A1 | 11/1993 |
| WO | WP 00/13524 | 3/2000 |

*Primary Examiner*—Reginald L. Alexander
(74) *Attorney, Agent, or Firm*—Winston & Strawn LLP

(57) ABSTRACT

A process and apparatus for applying to confectionery or ice cream products whereby the coating dispensing devices moves in a path along or between one or more rows of ice cream or confectionery products, thereby applying a patterned coating that is preferably reproducible.

21 Claims, 5 Drawing Sheets

U.S. PATENT DOCUMENTS

| | | | | |
|---|---|---|---|---|
| 4,421,773 | A | 12/1983 | Akutagawa | 426/249 |
| 4,449,906 | A | 5/1984 | Sienkiewicz et al. | 425/131.1 |
| 4,477,473 | A | 10/1984 | Schoonmaker et al. | 426/231 |
| 4,536,147 | A | 8/1985 | Groff | 425/323 |
| 4,542,028 | A | 9/1985 | Butcher et al. | 426/100 |
| 4,563,358 | A | 1/1986 | Mercer et al. | 426/89 |
| 4,587,128 | A | 5/1986 | Cummings | 426/303 |
| 4,622,891 | A | 11/1986 | Cramer et al. | 99/450.4 |
| 4,647,467 | A | 3/1987 | Pinto | 426/502 |
| 4,648,316 | A | 3/1987 | Ruffinatti | 99/483 |
| 4,679,496 | A | 7/1987 | Simelunas et al. | 99/450.2 |
| 4,715,803 | A | 12/1987 | Koppa | 425/133.1 |
| 4,732,770 | A | 3/1988 | Welygan et al. | 426/94 |
| 4,758,143 | A | 7/1988 | Lopes | 425/91 |
| 4,778,683 | A | 10/1988 | Newsteder | 426/249 |
| 4,778,685 | A | 10/1988 | Simelunas et al. | 426/297 |
| 4,793,786 | A | 12/1988 | Greenhouse et al. | 425/131.1 |
| 4,821,634 | A | 4/1989 | Swanson | 99/450.2 |
| 4,847,090 | A | 7/1989 | Della Posta et al. | 424/440 |
| 4,851,247 | A | 7/1989 | Greenhouse et al. | 426/250 |
| 4,858,524 | A | 8/1989 | Simelunas et al. | 99/450.2 |
| 4,873,104 | A | 10/1989 | Butcher et al. | 426/249 |
| 4,878,425 | A | 11/1989 | Butcher et al. | 99/450.2 |
| 4,894,002 | A | 1/1990 | Groff | 425/319 |
| 4,910,661 | A | 3/1990 | Barth et al. | 364/167.01 |
| 4,913,645 | A | 4/1990 | Daouse et al. | 425/150 |
| 4,923,706 | A | 5/1990 | Binley et al. | 426/516 |
| 4,932,317 | A | 6/1990 | Hoormann | 99/450.2 |
| 4,949,630 | A | 8/1990 | Knebl | 99/450.7 |
| 4,986,080 | A | 1/1991 | Grigoli et al. | 2/75 |
| 5,000,969 | A | 3/1991 | Beer | 426/101 |
| 5,019,404 | A | 5/1991 | Meisner | 426/249 |
| 5,035,905 | A | 7/1991 | Knebl | 426/284 |
| 5,073,389 | A | 12/1991 | Wienecke | 426/103 |
| 5,126,157 | A | 6/1992 | Burwell et al. | 426/516 |
| 5,229,149 | A | 7/1993 | Cone | 426/91 |
| 5,248,338 | A | 9/1993 | Price | 106/712 |
| 5,256,426 | A | 10/1993 | Tomioka et al. | 426/100 |
| 5,343,710 | A | 9/1994 | Cathenaut et al. | 62/71 |
| 5,374,436 | A | 12/1994 | White et al. | 426/249 |
| 5,435,143 | A | 7/1995 | Heinrich | 62/75 |
| 5,437,879 | A | 8/1995 | Kabse et al. | 426/5 |
| 5,447,036 | A | 9/1995 | Heinrich | 62/75 |
| 5,480,664 | A | 1/1996 | Ferrero | 426/307 |
| 5,516,540 | A | 5/1996 | Cathenaut | 426/249 |
| 5,582,856 | A | 12/1996 | White et al. | 426/249 |
| 5,686,128 | A | 11/1997 | Tracy et al. | 426/284 |
| 5,720,175 | A | 2/1998 | White et al. | 62/76 |
| 5,723,164 | A | 3/1998 | Morano | 426/572 |
| 5,891,246 | A | 4/1999 | Lund | 118/13 |
| 5,951,766 | A | 9/1999 | Miller | 118/667 |
| 6,054,166 | A | 4/2000 | Dupart | 426/549 |
| 6,340,488 | B1 | 1/2002 | French et al. | 426/302 |

CHOCOLATE COATING PROCESS AND DEVICE FOR SAME

FIELD OF THE INVENTION

The present invention relates to a process and apparatus for preparing a chocolate confection. In particular, a coating material is projected from at least one coating dispensing device directly onto the faces of a plurality of confectionery or ice cream products in a row as the coating dispensing device moves in a path along the row.

BACKGROUND OF THE INVENTION

Chocolate coatings can be difficult to apply to confectionery or ice cream products, principally because there is only a very short time period within which the coating must be applied to the confectionery product or a first layer of coating in order to achieve satisfactory adherence. The chocolate layer(s) are usually applied in liquid, semi-liquid, or paste form either by spraying, pouring, dipping, or pressing in a cold environment. Generally, this procedure results in the first layer glazing over to form a frost of condensation shortly after application thereof (less than 30 seconds), which prevents subsequent liquid layer(s) from adhering properly.

Several references disclose different types of chocolate or other edible coatings having the adherence problems. For example, U.S. Pat. No. 1,777,896 discloses an edible container shaped like a log made by spreading a plastic edible coating on the outside of a cylinder, adding bonbons to simulate branch stubs, and covering with a second layer of chocolate in a semi-liquid or plastic state.

U.S. Pat. No. 1,865,097 discloses hollow candy bodies made of chocolate having areas of the body formed with a color contrasting with the color of a major portion of the body. The hollow candy body may be prepared by chilling a dark chocolate in a portion of a mold, closing the mold and filling the mold with a light color chocolate, and chilling the mold again to form the light chocolate body overlaid by dark chocolate patches.

U.S. Pat. No. 2,288,970 discloses a confectionery such as ice cream having a coating of chocolate or other edible composition. In particular, the coating is provided with line formations or perforations that are pressed into the coating to control and limit the separation of coating from the confectionery product.

U.S. Pat. No. 2,457,110 discloses a method of coating chocolate edibles by dip-coating the edible in a coating of sufficiently low viscosity without the addition of cocoa butter. The chocolate is disclosed to be non-flowing at high temperatures due to the lack of cocoa butter in the composition during the dipping.

U.S. Pat. No. 3,971,853 discloses a frozen confection having a plurality of ingredients of individual colors, as well as a gravity feed arrangement for feeding a plurality of nozzles with the individually-colored ingredients so as to facilitate greater distribution of the ingredients.

U.S. Pat. No. 4,189,502 discloses marshmallow and other variegates having the ability to maintain a clear and distinct line of demarcation or delineation with a frozen dessert matrix into which the variegate is incorporated.

U.S. Pat. No. 4,369,200 discloses a method for producing three-dimensional decorations of a fatty confectionery material on a base confectionery, such as with a nozzle attached to a compressible bag for depositing the decorations. The deposition preferably occurs from a rotary sprayer, which deposits the decoration by use of a plurality of recesses in a mold.

U.S. Pat. No. 4,587,128 discloses a method of making an iced piece of cake and providing good adhesion between the icing coating and the cake by adding a bonding layer to a cake, applying the icing, completely enrobing it with a chocolate layer, cooling and solidifying the chocolate layer, and subsequently decorating the top and sides by pressing thereon "squiggles" having a different color.

We have now devised an apparatus and methods for obtaining chocolate coatings by a process whereby the product to be coated remains stationary and the apparatus moves between the rows of the products to apply the coatings, as well as confectionery or ice cream products having a coating formed thereon from two layers of chocolate, whereby the second layer adheres satisfactorily to the first layer.

SUMMARY OF THE INVENTION

The invention relates to a process for preparing a coated confectionery or ice cream product comprising the steps of providing a row of confectionery or ice cream products, and providing a partial coating onto the products by projecting a coating material from a coating dispensing device directly onto at least a portion of each product in the row as the coating dispensing device moves in a path along the row of products. Preferably, the row of products remains stationary as the coating dispensing device moves along the path and coating material is projected from the coating dispensing device by centrifugal force as the coating dispensing device rotates.

Generally, a plurality of rows of products are provided, with at least two products per row, and the process includes the step of advancing a subsequent row of products after coating material has been applied onto the products of a previous row. When the products have front and rear sides, the rows of products can be advanced substantially perpendicularly to the path of the coating device. This enables the coating dispensing device to move from a home position at one end of the rows to a displaced position at the opposite end of the rows while projecting the coating material directly onto at least a portion of the rear sides of the products in the previous row and onto at least a portion of the front sides of the products in the subsequent row as the coating device passes along and between the rows. Thereafter, the rows of products are advanced after the coating dispensing device moves to the displaced position, and then the coating dispensing device is returned to the home position by passing the coating device along and between the rows while projecting coating material directly onto at least a portion of the rear sides of the products in the row that contains products with a coating on the front faces, and onto at least a portion of the front sides of the products in a subsequent row.

In another embodiment, the coating material comprises a water-based edible coating material, such as a water-based creamy mix, a non-aerated ice cream mix, a colored or flavored sorbet, water ice, or fruit puree. Advantageously, the coating material is projected onto the products in a reproducible pattern.

In one embodiment, the rows comprise 6 to 12 products per row and a full coating is applied onto the products by dipping, enrobing, or spraying before the coating material is projected from the coating device. If desired, a second partial coating can be applied onto the products after applying the full coating. The second partial coating material will usually be a different material or different color than the first partial coating material. For convenience, each of the full coatings and partial coating materials is a chocolate. Also, the partial coating material can include more than one color for enhanced visual results. In another embodiment, approximately 12 to 24 products per row can be used according to the invention.

The invention further relates to an apparatus for coating confectionery or ice cream products including a positioning device to hold a plurality of confectionery or ice cream products to be coated in a plurality of rows; a coating dispensing device that moves reversibly along a row between a home position at one end of the rows to a displaced position at the opposite end of the rows to apply at least one coating material to a portion of the products; and an indexing device capable of advancing the rows of products in stepwise fashion to advance at least one row of products past the at least one coating dispensing device after it moves from one position to the other.

Advantageously, the positioning device holds the plurality of confectionery or ice cream products in a vertical position, and the at least one coating dispensing device rotates to apply the coating material to the products by centrifugal force. The coating dispensing device typically rotates at a speed of about 300 to 700 rpm and the indexing device advances the rows of products once every about 0.1 seconds to 30 seconds. A general coating dispensing device comprises at least one rotatable pipe or cup with about 2 to 10 outlets. If desired, two coating dispensing devices can be used.

BRIEF DESCRIPTION OF THE DRAWINGS

Further features and advantages of the invention can be ascertained from the following detailed description which is provided in connection with the attached drawings, wherein.

DETAILED DESCRIPTION OF THE PREFERRED EMBODIMENTS

Figure 1:
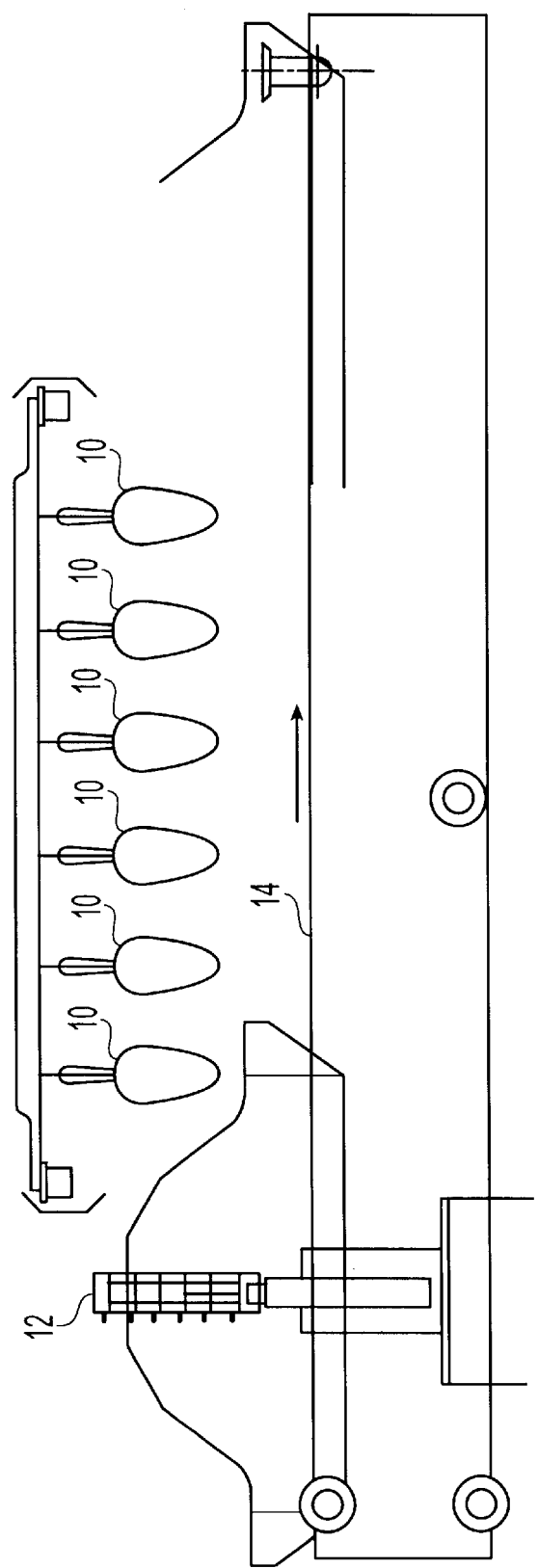
FIG. 1 is a front view of the apparatus of the present invention.

The present invention relates to an apparatus and method for coating a confectionery or ice cream product whereby the coating device preferably moves past the confectionery or ice cream product, preferably while the product remains stationary. Such method for coating has the advantage of providing new and different reproducible coating patterns than those available previously.

The present invention advantageously provides an apparatus for applying a coating, or chocolate substitute coating, to a confectionery in a reproducible pattern to provide a desired appearance. The coating material preferably includes more than one type of material, especially two types of material. In one embodiment, the coating is applied in a single layer on the confectionery or ice cream product. Advantageously, the coating is deposited as two layers of coating material. The layer(s) may be continuous or discontinuous. Preferably, when two layers of coating material are formed, they include different types or colors of materials, such as chocolates of different colors. Thus, at least two layers each having different textures or appearances can be used, e.g., plain chocolate, milk chocolate, or white chocolate. Coatings in which one layer includes either milk or plain chocolate and another layer includes white chocolate are interesting visually because there may be a marked contrast between the darker colored milk or plain chocolate, and the white chocolate. Each layer generally has a thickness of about 0.1 mm to 2 mm, preferably from about 0.25 mm to 1.5 mm, and more preferably from about 0.5 mm to 1.0 mm.

The coating material may include chocolate or a water-based material, or both. It may include a water-based creamy mix, a non-aerated ice cream mix without overrun, a colored or flavored sorbet, water ice, or fruit puree of a suitable viscosity provided there were no fibrous pieces of significant size present. The water-based creamy mix contains at least about 10% water, more usually at least about 25% by weight water, preferably from about 30% to 70%, and more preferably from about 35% to 60% by weight water together with from, for instance, about 2.5% to 10% cream, about 15% to 25% white chocolate, sugar and emulsifiers, optionally with coloring material.

Any type of edible chocolate or chocolate substitute may be included in the coating material. The chocolate may be, for instance, ordinary chocolate according to accepted regulations or it may be a fat containing confectionery compound material containing sugar, milk derived components, and fat and solids from vegetable or cocoa sources in differing proportions having a moisture content less than about 10 percent, preferably less than about 5 percent by weight. The fat-containing material may be a chocolate substitute containing direct cocoa butter replacements, stearines, coconut oil, palm oil, butter or any mixture thereof, nut pastes such as peanut butter and fat; praline; confectioner's coatings used for covering cakes usually comprising chocolate analogues with cocoa butter replaced by a cheaper non-tempering fat; or CARAMAC, a product which is a mixture of non-cocoa butter fats, sugar, and milk available from Nestle.

The confectionery or ice cream product that is coated may be, for instance, ice cream or any other confectionery product which may conventionally be coated with chocolate, e.g., praline, cake, fondant, water ice, sherbet, or other filling. The design and use of the apparatus described herein will primarily determine the type of coating appearance on the confectionery or confectionery product being coated. Each coating layer may have the appearance of a generally linear or striping effect, a drizzle with a roughly continuous stripe, a splatter with a roughly discontinuous stripe, a plurality of stripes, spots, or combinations thereof. The coating patterns are affected by the rate at which the coating material is fed to the coating dispensing device. For example, if the coating material is fed at a very high rate, a continuous and relatively thicker stripe would result. If the material is fed more slowly, the stripe would be discontinuous, or the resulting pattern may be dashes or spots.

The confectionery or ice cream products may be dipped, enrobed, sprayed, or the like, with coating material to provide one or more layers of coating. These can be applied before or after coating with the stripes, splatter, or spots. In a preferred embodiment, a first coating layer adjacent the confectionery or ice cream product is applied by dipping, enrobing, or spraying the product entirely in coating material prior to adding a second coating layer with a pattern of stripes, splatter, or spots. These patterns may be random or ordered. The second coating can have a different color from the first coating to give a contrasting effect. Preferably the patterns are reproducible as a result of using the apparatus of the invention. Although each of these are desired arrangements of the coating according to the invention, it should be understood that any design incorporating these or other arrangements may be provided to the coating.

The present invention also provides a process for preparing a confectionery or ice cream product with a coating having a drizzle appearance with a roughly continuous stripe formed from two layers of coating material. A continuous stream of a coating is randomly projected onto the confectionery or ice cream product and solidified. Optionally, as in any embodiment herein, a layer of coating can be applied before or after the drizzled layer is applied, such as by enrobing, spraying or dipping, to completely or partially coat the confectionery or ice cream product with the layer.

One example of a process for preparing a confectionery or ice cream product with a chocolate coating having a drizzle appearance with a roughly continuous stripe formed from two layers of chocolate includes dipping the confectionery or ice cream product into a first chocolate within a container to coat the confectionery or ice cream product, withdrawing the coated confectionery or ice cream product from the container and then projecting a continuous stream of a second chocolate randomly past the coated confectionery product and solidifying the coating.

The present invention also provides a process for preparing a confectionery product with a coating having a splatter appearance with a roughly discontinuous stripe formed from two layers of coating material which includes applying a first coating to the confectionery product by enrobing, spraying or dipping to coat the confectionery product with a first layer of material, and then projecting a discontinuous stream of a second material randomly past the coated confectionery product by interrupting the flow of the second coating material and solidifying the coating.

The above processes for preparing a confectionery product with a coating having a drizzle or a splatter appearance may be accomplished by the projection of the continuous or discontinuous stream of the second coating may be carried out by spray nozzles or by means of the centrifugal force of a spinning device. The nozzles may be operated by a pump generating a pressure of from, e.g., about 50 to 150 psi, and preferably from about 75 to 125 psi. The second chocolate may be fed on to the upper surface of the spinning device. The spinning device is preferably a disk. The disk is preferably elliptical in shape and the flat surface may advantageously be inclined from the horizontal, e.g., up to about 30° and preferably from about 5° to 25°.

In an advantageous embodiment of the present invention, a confectionery product with a coating having the appearance of either stripes or spots may be obtained by applying a first coating material to the confectionery product by enrobing, spraying or dipping to coat the confectionery product with a first layer of material, and then passing a device that includes the opposing faces of a pair of spinning disks past or between rows of confectionery products. The spinning disks project streams of a second coating material by centrifugal force onto the coated confectionery product, and then the coating is solidified. The coating material may be applied to the spinning disks by pumping the material through tubing, e.g., stainless steel, onto the spinning disks.

The spinning disks may be made of one or more materials that may safely contact edible products, but are preferably metal to provide durability, and more preferably stainless steel. The disks may be substantially circular or elliptical and may be of various sizes. It is possible for one disk to have a different shape or size than the other disk of the pair. The disks are preferably inclined to one another, e.g., up to an angle of about 45° and preferably from about 25° to 35° to the axis of conveyance of the confectionery product. Advantageously, the inclination can be arranged such that the edges of the disks downstream of the direction of conveyance of the apparatus are closer than the edges of the disks upstream of the direction of conveyance of the apparatus.

The disks are preferably mounted facing the front and rear center of the bars. Each bar may be passed, for example, vertically or horizontally between the disks. The spinning of the disks may be achieved, for instance, by a variable drive motor for each disk or one or more motors and a timing belt. Any suitable rotating means may be used for spinning the disks. The design on the confectionery product may be arranged by altering the speed of the spinning disks or other coating applicator device. The speed of the disks is preferably at least about 50 rpm and may be up to about 2500 rpm or more, depending on the space constraints dictated by the machine on which the product is to be made. The speed on the disk which produces stripes or spots is a function of the distance between the disk and the product to be coated.

The coating may also be applied to the confectionery or ice cream product in the apparatus in various ways, for example by spraying or pouring the coating from the disks or nozzles onto the product, by conveying the product through a stream of the coating, or by passing the apparatus past the products. The motion of the apparatus with respect to the products to be coated may be altered by one of ordinary skill in the art to help obtain the desired pattern of the coated product. Different embodiments of the apparatus, such as using cups or pipes in place of the disks, are discussed in more detail below.

The present invention preferably provides for an apparatus and method for coating a confectionery or ice cream product whereby the coating device moves past the confectionery or ice cream product. In one embodiment, the product remains stationary, while the coating applicator passes along or between row(s) of products. In this embodiment, the coating device may have a rotating applicator that travels between or around two rows of products and applies the coating on the products using the centrifugal force of the rotating applicator. The coating dispensing applicator preferably includes one or more rotating devices, such as a cup, disk, tube, moveable or pivotable nozzle, or the like, or a non-rotating nozzle. Preferably, after the applicator passes a row of the products, the rows of products are advanced relative to the applicator, such that the next row(s) is/are ready for application of coating materials. The applicator then travels between or around the selected rows, applying a coating or pattern to this row or rows of products. As used herein, a "coating" means not only a coating covering the entire product, but also applying the coating material as a partial covering or in a pattern, such pattern being advantageously either reproducible or random.

A rotating-type coating dispensing applicator preferably rotates at from about 300 to 700 rpm, more preferably at about 400 to 600 rpm, and most preferably at about 450 to 550 rpm. When a pipe is used as an applicator, it typically has a diameter of about 0.75 to 3 inches, preferably about 1 to 2 inches, and more preferably about 1.25 to 1.75 inches. When a pipe or cup is used, the applicator typically has about 2 to 10 outlets for the coating to flow through and onto the product. In a preferred embodiment, about 4 to 6 coating outlets each with a diameter of about ⅛ inch are present. Typically, two or more confectionery or ice cream products would be in each row. Preferably, about 6 to 12 products are in each row. Between passes of the applicator, the rows of products typically advance about once every 0.1 to 30 seconds, preferably about once every 1 to 10 seconds, more preferably about every 1.5 to 5 seconds, and most preferably every 2 to 3 seconds. Thus, the applicator must coat along a full row of products during this time before the row advances. The ratio of time that the system spends advancing the rows to the time it spends stationary as the coating dispensing applicator passes through the rows is about one-third to two-thirds.

In another embodiment, two or more coating dispensing devices can be used on the same apparatus, thereby allowing more multiple coatings to be applied simultaneously, either to the same row of products or to different rows. Baffles can be provided so that one coating material is applied in one direction and another coating material is provided in a different direction, e.g., one upon the back faces of one row of products and the other onto the front faces of a subsequent row of products. Two identical dispensing devices could be applying coatings at the same time, but located several rows apart from each other. This embodiment could be employed to allow one coating or pattern to sufficiently dry or harden on the products before a second coating material is applied. Also, multiple applicators can permit both the front and back of a row of products to be simultaneously coated. In the first embodiment, the at least two coating dispensing devices can be on the same side of the products, while in the second embodiment, they may be disposed on opposite sides of the row of products. This would allow more than one material or color to be applied at one time. The device could advantageously permit recovery and recirculation of coating material that does not remain on the products, such as an overflow pan or drip tray.

The apparatus of the present invention also may include a positioning device to hold the rows of confectionery or ice cream products in place, at least one coating dispensing device to apply each coating material, and an indexing device to advance the rows of products in a stepwise fashion, i.e., pausing slightly after each advance, relative to the coating dispensing device after they have been coated. The positioning device would preferably hold the rows of products in a vertical position. Vertical positioning, however, is not required, as the products may be rotated or turned during the coating such that the tops, bottoms, and/or sides could also be coated. This is also true in the case of a round product that does not necessarily have "sides" or "faces" per se. The products can optionally, but preferably be packaged by any downstream packaging equipment available to those of ordinary skill in the art.

Figure 2:
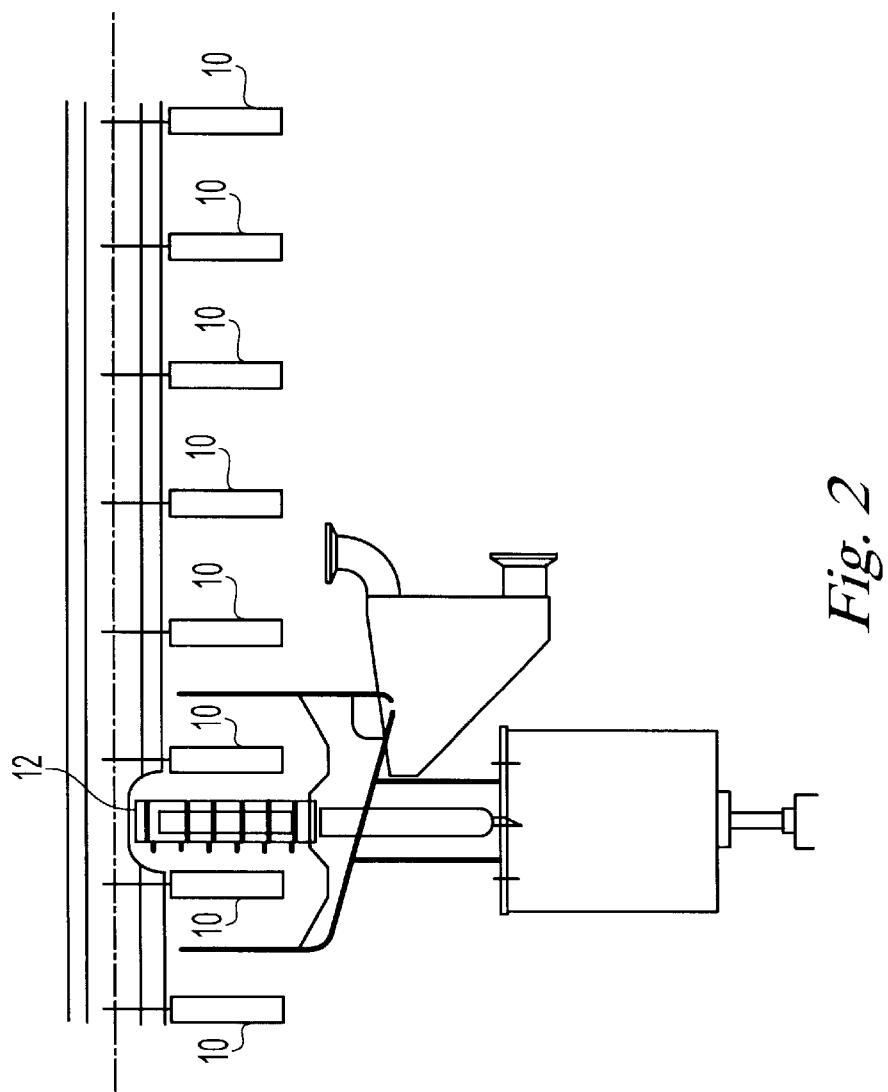
FIG. 2 is a side view of the apparatus of the present invention.

Referring now to FIGS. 1 and 2, a row of ice cream bars 10 is shown hanging in a vertical position. The apparatus is shown to have a rotating coating dispensing device 12 that moves along a path 14 between two rows of bars. Once it has passed between two rows, the bars 10 are advanced to allow the apparatus to pass in a return direction between or among the next two rows. In one preferred embodiment, the rows of products advance in a substantially perpendicular fashion to the path of the coating dispensing device(s) 12. In this way, the apparatus can apply a coating or pattern to opposing sides of two different rows of bars 10 simultaneously. When the bars 10 are advanced, the apparatus then coats the second side of one row and the first side of the next row of bars 10.

Figure 3:
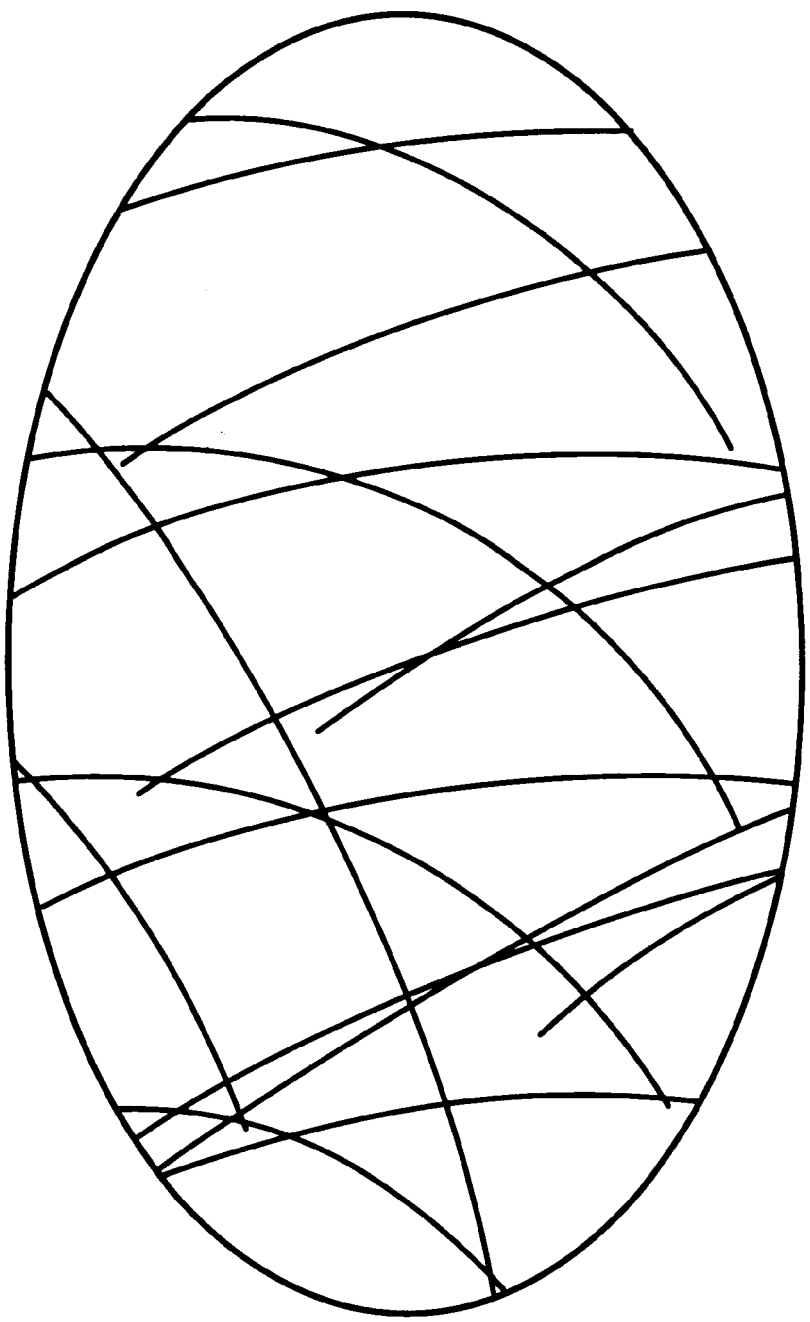
FIG. 3 is an illustration of an ice cream product that includes a coating pattern provided by the apparatus of the present invention.

FIG. 3 shows one possible striped coating pattern that may be produced according to the present invention. Many others are possible, and it may be advantageous to market different patterns in different regions depending on market decisions. Preferred selections can be made by one of ordinary skill in the art.

Figure 4:
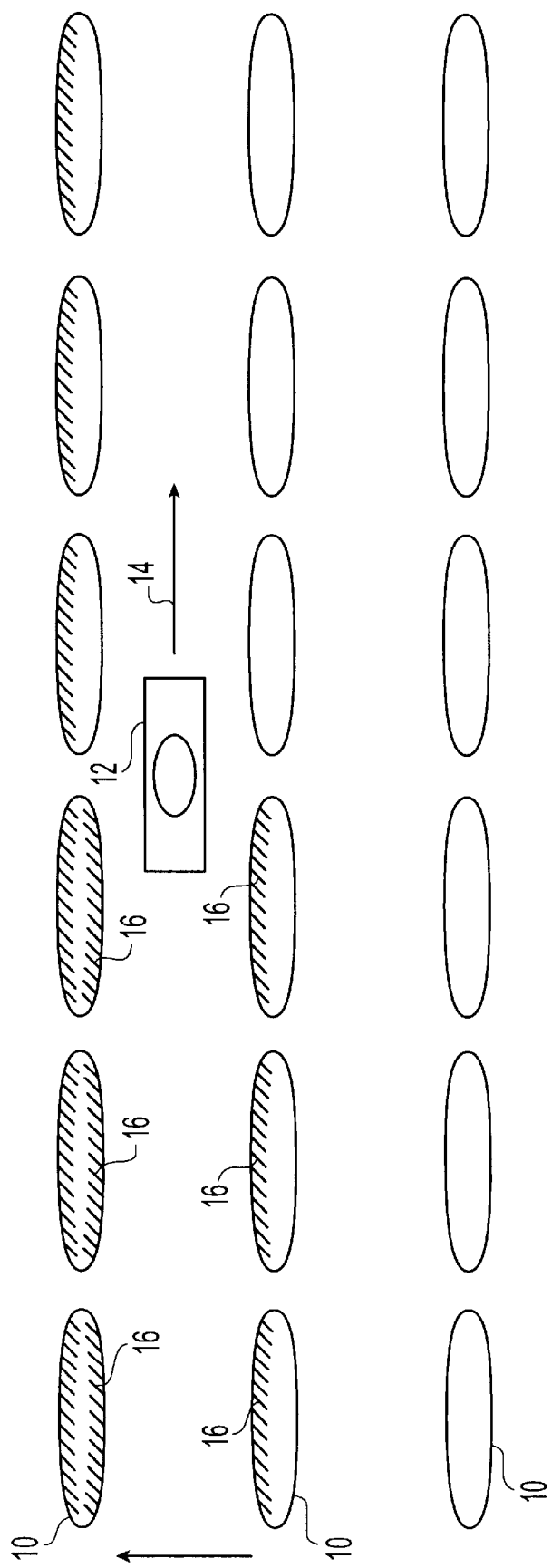
FIGS. 4 and 5 are overhead views of the apparatus of the present invention.
Figure 5:
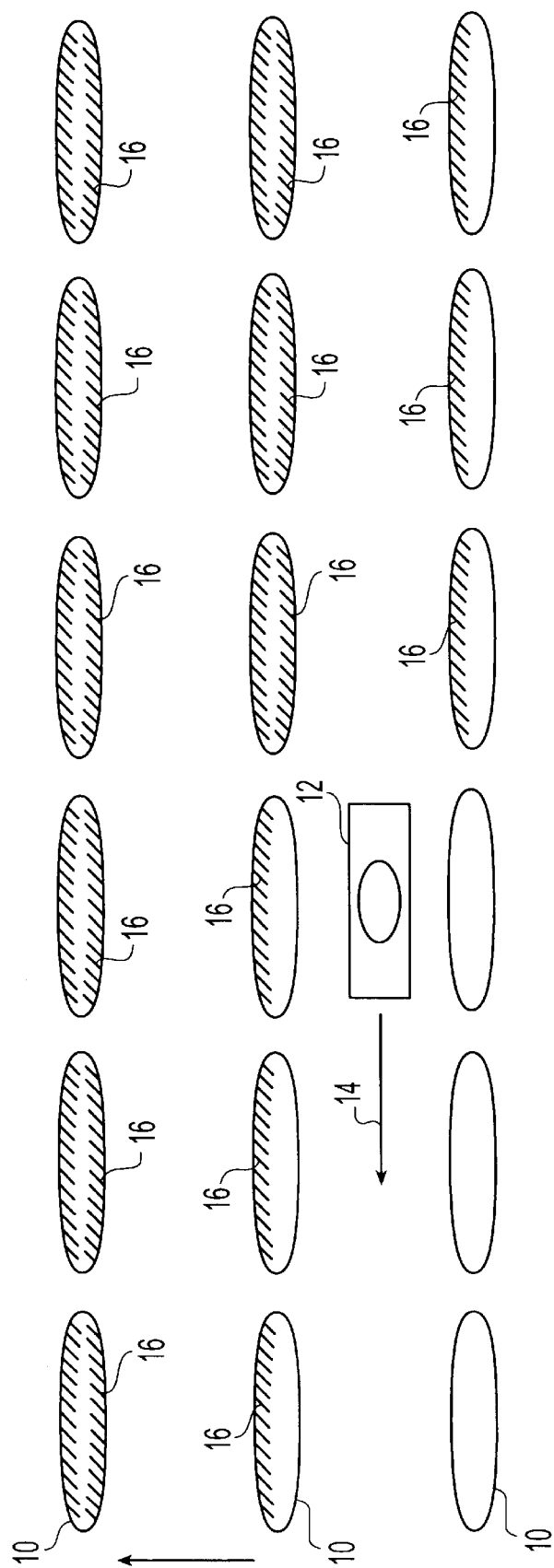

FIGS. 4 and 5 show the top of several rows of bars 10 with a coating dispensing device 12 moving along a path 14 perpendicular to the rows, i.e., the device 12 moving from a home position to a displaced position. The coating material 16 has been applied to one side of the bars in the rows that the coating dispensing device 12 has already moved past. In FIG. 5, the rows of bars 10 have been advanced and the coating dispensing device 12 is moving in the reverse direction, i.e., from the displace position to the home position, along the next pair of rows to apply the coating 16. Each side of the bars is coated by a coating material that is dispensed from the coating dispensing device 12 as the device moves past the bars.

In FIG. 4, the front side of the advanced row has already been coated and the back side is being coated and the front side of the subsequent row, i.e., the middle row in the drawing, is being coated. The dispensing device 12 then moves between these two rows 10 and completely clears the end of the rows 10 as it begins returning toward the home position. The rows 10 are advanced while the dispensing device 12 has cleared the end of the rows 10 and the dispensing device 12 moves in the return direction toward the home position between the middle and bottom rows 10 as shown in FIG. 5. In this way, the back side of the middle row 10 and the front side of the bottom row 10 are coated (with middle and bottom being defined solely based on the overhead viewpoint).

EXAMPLE

The invention is further defined by reference to the following example describing in detail the process disclosed herein. It will be apparent to those skilled in the art that many modifications, both to materials and methods, may be practiced without departing from the purpose and interest of this invention.

Example 1

Applicator and Process According to Invention

An applicator can be prepared with any of the devices mentioned herein, such as a pair of rotatable disks. The applicator can be designed to travel about 10 to 30 inches (254 to 762 mm) per second. For a row of 12 bars that is approximately 36 inches long, the initial and final position of the applicator might be 6 inches beyond the row of bars. The path of the applicator is thus 48 inches long and, at 30 inches per second, requires the bars to remain stationary for a period of at least 1.6 seconds before advancing. During that time, the applicator can pass between two rows to apply the coating material to opposing faces of products in two rows. At this rate, the total production would be about 338 bars per minute. The results showed that the bars had a plurality of uniform stripes on the front and back, such as those shown in FIG. 3.

Although preferred embodiments of the invention have been described in the foregoing description, it will be understood that the invention is not limited to the specific embodiments disclosed herein but is capable of numerous modifications by one of ordinary skill in the art. It should be understood that the materials used and the mechanical details may be slightly different or modified from the descriptions herein without departing from the methods and compositions disclosed and taught by the present invention as recited in the claims.

What is claimed is:

1. A process for preparing a coated confectionery or ice cream product comprising:

providing a row of confectionery or ice cream products: and providing a partial coating onto the products by projecting a coating material from a coating dispensing device directly onto at least a portion of each product in the row as the coating dispensing device moves in a path along the row of products wherein the row of products remains stationary as the coating dispensing device moves along the path and coating material is projected from the coating dispensing device by centrifugal force as the coating dispensing device rotates.

2. The process of claim 1, wherein a plurality of rows of products are provided with at least two products per row, and which further comprises advancing a subsequent row of products after coating material has been applied onto the products of a previous row.

3. The process of claim 2, wherein the products have front and rear sides, and the rows of products advance substantially perpendicularly to the path of the coating device, and wherein the coating dispensing device moves from a home position at one end of the rows to a displaced position at the opposite end of the rows while projecting the coating material directly onto at least a portion of the rear sides of the products in the previous row and onto at least a portion of the front sides of the products in the subsequent row as the coating device passes along and between the rows.

4. The process of claim 3, further comprises advancing the rows of products after the coating dispensing device moves to the displaced position, and then returning the coating dispensing device to the home position by passing the coating device along and between the rows while projecting coating material directly onto at least a portion of the rear sides of the products in the row that contains products with a coating on the front faces, and onto at least a portion of the front sides of the products in a subsequent row.

5. The process of claim 1, wherein the coating material comprises a water-based edible coating material.

6. The process of claim 5, wherein the water-based coating material comprises at least one of a water-based creamy mix, a non-aerated ice cream mix, a colored or flavored sorbet, water ice, or fruit puree.

7. The process of claim 1, wherein the coating material is projected onto the products in a reproducible pattern.

8. The process of claim 1, wherein the rows comprise 6 to 12 products per row and further comprising applying a full coating onto the products by dipping, enrobing, or spraying before the coating material is projected from the coating device.

9. The process of claim 1, wherein the partial coating material is applied as in a pattern selected from the group consisting of stripes, splatter, and spots.

10. A process for preparing a coated confectionery or ice cream product comprising:

providing a row of confectionery or ice cream products, providing a first partial coating onto the products by projecting a coating material from a coating dispensing device directly onto at least a portion of each product in the row as the coating dispensing device moves in a path along the row of products, applying a full coating onto the products by dipping, enrobing, or spraying before the coating material is projected from the coating device, and applying a second partial coating onto the products after applying the full coating.

11. The process of claim 10, wherein the second partial coating material comprises a different material from that of either the first partial coating material or the full coating material.

12. The process of claim 10, wherein the full coating material and at least one of the partial coating materials each comprises chocolate.

13. The process of claim 10, wherein the second partial coating material comprises more than one color and wherein the color is different from a color of the full coating.

14. The process of claim 10 wherein the second partial coating material is applied in a pattern selected from the group consisting of stripes, splatter, and spots.

15. A process for preparing a coated confectionery or ice cream product comprising:

providing a row of confectionery or ice cream products; and providing a partial coating onto the products by projecting a coating material from a coating dispensing device directly onto at least a portion of each product in the row as the coating dispensing device moves in a path along the row of products, wherein the coating is applied by an apparatus that includes a positioning device to hold a plurality of confectionery or ice cream products to be coated in a plurality of rows; at least one coating dispensing device that moves reversibly along a row between a home position at one end of the rows to a displaced position at the opposite end of the rows to apply at least one coating material onto at least a portion of the products; and an indexing device capable of advancing the rows of products in stepwise fashion to advance at least one row of products past the at least one coating dispensing device after it moves from one position to the other.

16. The process of claim 15 wherein the positioning device holds the plurality of confectionery or ice cream products in a vertical position with regard to the coating device.

17. The process of claim 15, wherein the at least one coating dispensing device rotates to apply the coating material to the products by centrifugal force and the indexing device advances the rows of products once every about 0.1 seconds to 30 seconds.

18. The process of claim 15, wherein the coating dispensing device rotates at a speed of about 300 to 700 rpm.

19. The process of claim 15, comprising two coating dispensing devices.

20. The process of claim 15, wherein the coating dispensing device comprises at least one rotatable pipe or cup with about 2 to 10 outlets.

21. The process of claim 15, wherein the partial coating material is applied in a pattern selected from the group consisting of stripes, splatter, and spots.

* * * * *